2,170,789

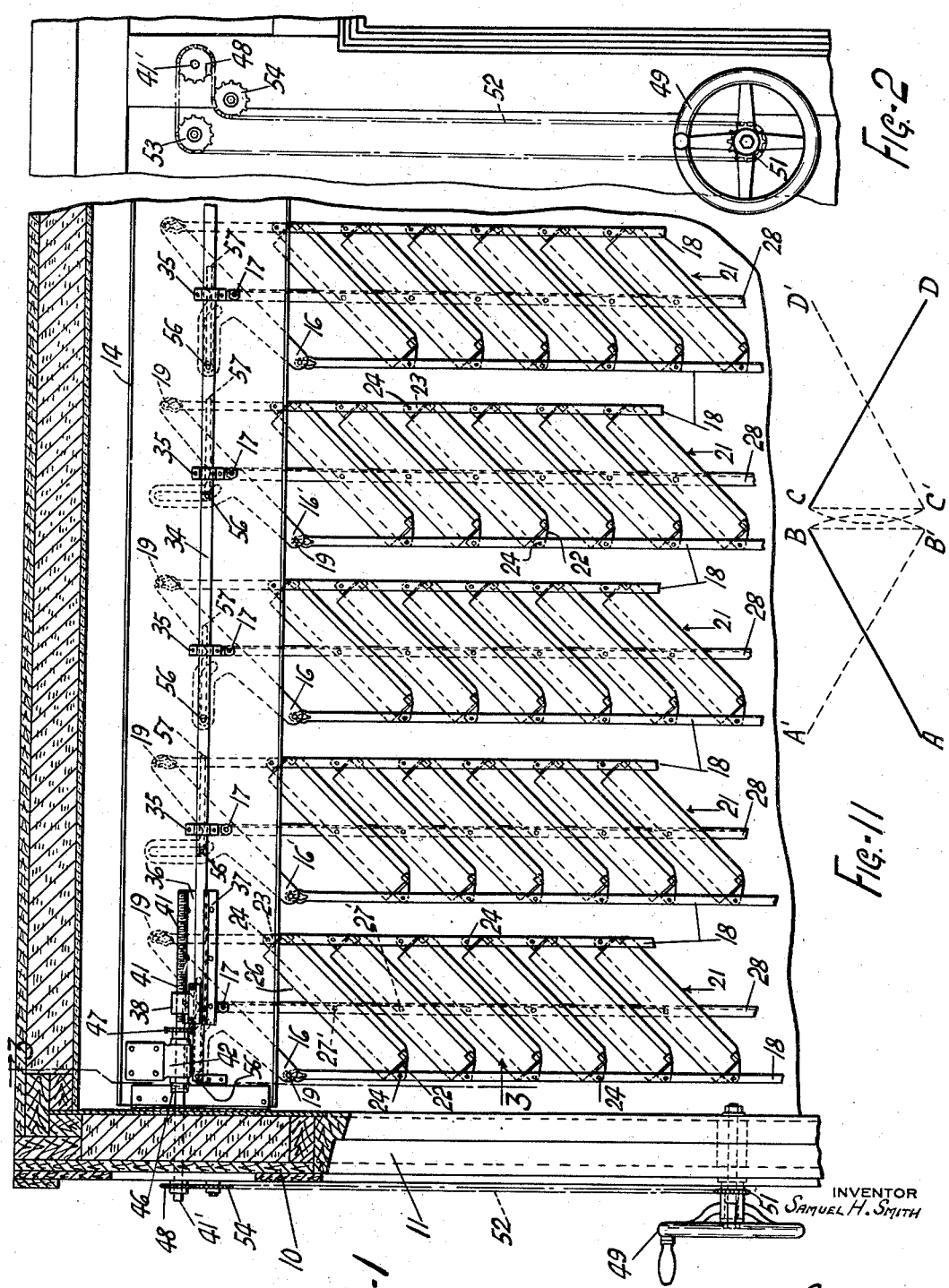

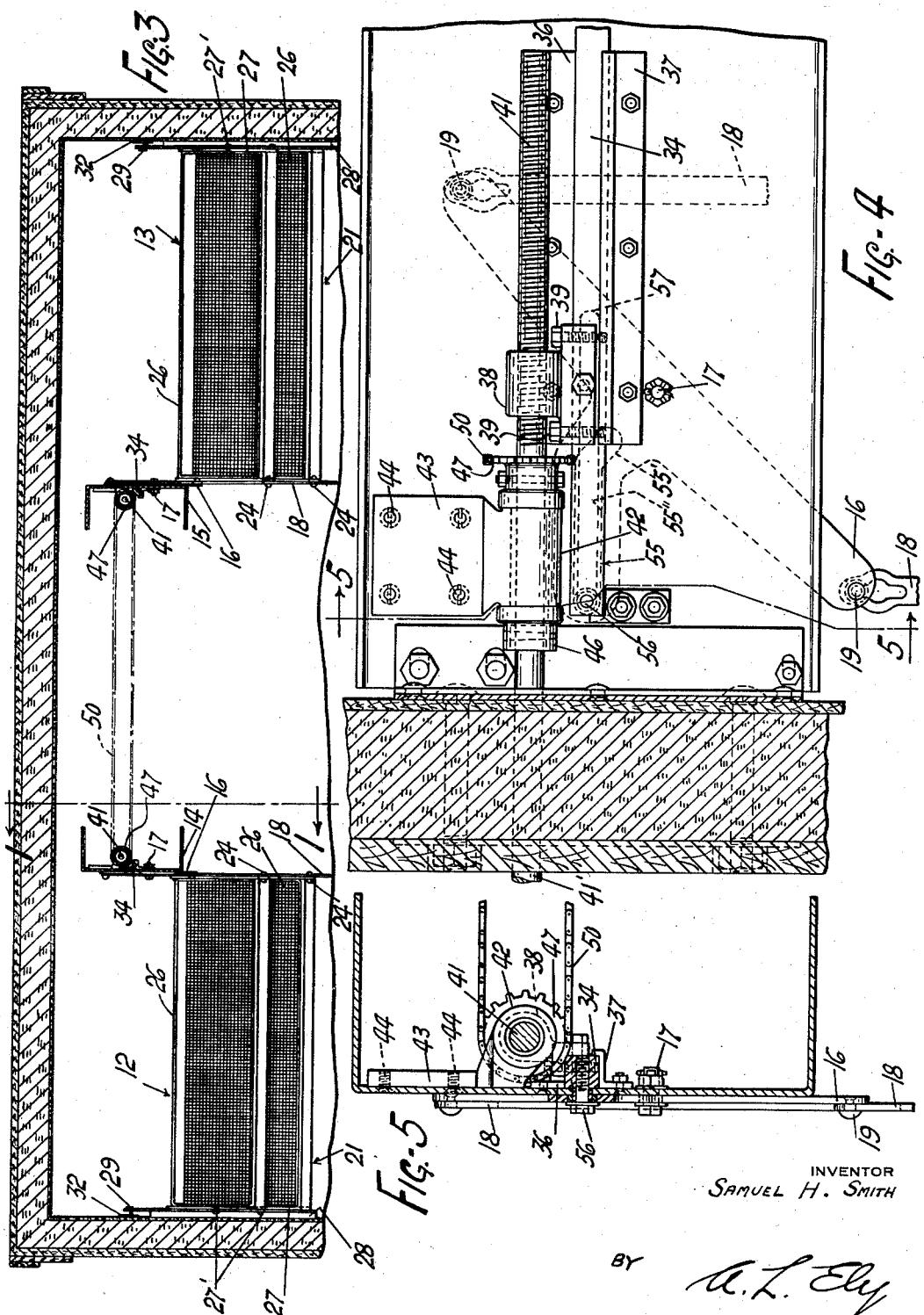
Aug. 22, 1939. S. H. SMITH 2,170,789
EGG TURNING MECHANISM FOR INCUBATORS
Filed July 21, 1936 3 Sheets-Sheet 2
INVENTOR
SAMUEL H. SMITH
BY
ATTORNEY Aug. 22, 1939.  S. H. SMITH  2,170,789
EGG TURNING MECHANISM FOR INCUBATORS
Filed July 21, 1936  3 Sheets-Sheet 3
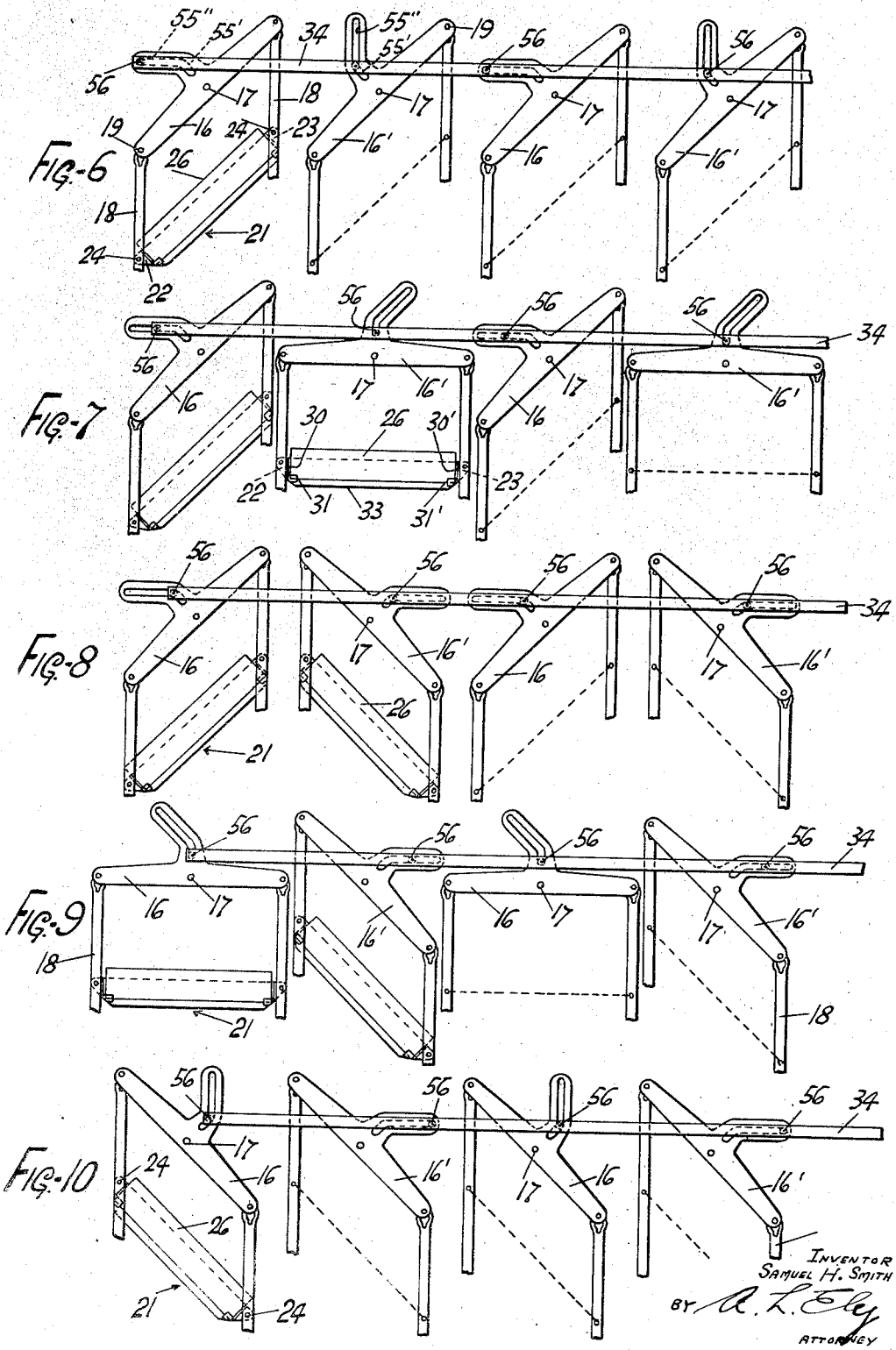
INVENTOR
SAMUEL H. SMITH
BY
ATTORNEY Patented Aug. 22, 1939

UNITED STATES PATENT OFFICE 2,170,789

EGG TURNING MECHANISM FOR INCUBATORS

Samuel H. Smith, Rocky River, Ohio

Application July 21, 1936, Serial No. 91,693

20 Claims. (Cl. 119—44)

This invention relates to the art of incubation and to incubators in which tiers of eggs are arranged in columns. During the period of incubation, the eggs are turned, usually by tilting the egg trays which may be held individually in frames, or the trays may be mounted directly upon movable members, such as chains. The eggs may be turned conveniently by turning or tilting the egg trays from one inclined position to an oppositely inclined position, but during such a turning operation, each tray swings through an arc which has a greater dimension horizontally than the corresponding projected horizontal dimension of the tray after it comes to rest in either of its inclined positions. In order to turn the eggs in this manner, it has been necessary to provide space for each column of trays equal at least to the maximum width of the trays, or the width of the tray frames which hold the trays if such frames are used. The purpose of this invention is to provide for reducing the spacial requirements for egg trays and for the frames so that adjacent columns of eggs may be spaced more closely together without interfering with the turning of the eggs. This invention provides for spacing adjacent tiers of eggs so closely that their trays or the frames for the egg trays may swing through intersecting arcs when the eggs are turned.

In another aspect, the invention provides means adapted to cooperate with the improved spacing arrangement to turn a plurality of columns of eggs without causing interference between the egg supporting means of adjacent columns. This improved egg turning means may also be used advantageously even where the improved spacing arrangement is not utilized.

It is also an important object of this invention to provide apparatus of the general class referred to, having an improved construction and relative arrangement of parts.

The features of the invention are illustrated in the accompanying drawings wherein:

Fig. 1 is a longitudinal section along the line 1—1 of Fig. 3, illustrating a portion of an incubator with the egg trays in one of their inclined positions;

Fig. 2 is a fragmentary front elevation of the incubator showing the operating means for the egg turning apparatus;

Fig. 3 is a transverse section along the line 3—3 of Fig. 1, but showing only the upper portion of the incubator and illustrating the means for actuating the egg turning mechanism for the incubating compartments on the sides of the incubator in unison;

Fig. 4 is a fragmentary view similar to Fig. 1, and illustrating a portion of the mechanism shown in Fig. 1 to an enlarged scale;

Fig. 5 is a section along the line 5—5 of Fig. 4;

Figs. 6, 7, 8, 9 and 10 are elevational views with parts omitted and broken away to illustrate the improved spacing arrangement and the different positions of the egg supporting means and of the apparatus for shifting the egg supporting means to the positions shown; and Fig. 11 is a diagrammatic view illustrating features of the spacing arrangement.

In the preferred embodiment selected for illustration, the incubator comprises an insulated cabinet 10 having a door opening 11 to a central passageway which leads between incubating compartments 12 and 13 (Fig. 3). Suitable frame members, such as the channels 14 and 15 extend along the passageway adjacent the top thereof. The columns of egg trays are supported at one end from these channels. Along the side of each channel facing the incubating compartment the cam members 16 and 16' are mounted to pivot on pivot bolts 17. Depending links 18 are pivotally connected to the ends of each cam member by means of pivot bolts 19. Frames 21 for the egg trays have projecting ears 22 and 23 which are pivotally connected to the links 18 by means of rivets 24. Each of the frames 21 is adapted to receive an egg tray 26. The ends 27 of the frames 21 which are adjacent the cabinet wall (Fig. 3) are pivotally connected at their mid-points by rivets 27' to the flanges of upright angles 28 which may be attached to the cabinet in any approved manner. Preferably, these angles have holes at their upper ends which receive hooks 29 carried by the fixed bar 32. These frames 21 have parallel sides 30 and 31' (Fig. 7) extending from the ends 27 to the end of the trays adjacent the central passageway where these sides are equipped with the ears 22 and 23 and also with abutments 31 and 31' for retaining the tray and yet having this end of the frame substantially open to facilitate loading and unloading. These frames may have any suitable bottom member or members indicated at 33.

An actuating bar 34 is mounted on each of the channels 14 and 15 on the sides opposite those on which the cam members 16 and 16' are disposed. These bars are slidable longitudinally through spaced guides 35 (Fig. 1) and between a plate guide 36 (Fig. 4) and an angle guide 37. A nut 38 is fixed to the bar 34 by means of the bolts 39, and receives a threaded shaft 41 which is rotatably mounted in a bearing 42 having a bracket 43 attached to the channel by screws 44. The shaft 41 is held from longitudinal movement by a collar 46 on one side of the bearing and by the hub of a sprocket 47 which is fixed to the shaft on the other side of the bearing. The shaft 41 which is mounted on one of the channels, as on the channel 15, need not extend substantially beyond the collar 46, while the shaft mounted on the channel 14 has a section 41' which extends through the cabinet and carries a sprocket 48 (Fig. 2). At some convenient point, as adjacent the door opening 11, a hand wheel 49 is mounted on the cabinet and a sprocket 51 is fixed to the hub of the handwheel. A chain 52 is trained over the sprockets 48 and 51 and also over idler sprockets 53 and 54 (Fig. 2). Within the incubator a chain 50 is trained over the sprockets 47 to cause the shafts 41 to operate in unison. Each of the cam members 16 and 16' has a closed slot 55 which receives a pivot bolt 56 (Fig. 5) fixed to the actuating bar 34. These pivot bolts travel through horizontal slots 57 (Fig. 4) in the channel beams 14 and 15. Each of the closed slots 55 in the cam members has a portion 55' extending substantially radially of the pivotal mounting of the cam member and another portion 55'' extending at an angle to the portion 55'. In adjacent cam members 16 and 16', these angularly extending portions 55'' are oppositely inclined.

The features of the improved spacing arrangement for the egg supporting means are illustrated diagrammatically in Fig. 11. In considering this view let the line AB represent the overall width of a frame 21 as supported by a cam member 16 in Fig. 8, and similarly, let the line CD represent the overall width of an adjacent frame 21 carried by a cam member 16'. When the line AB swings about its midpoint to the position A'B' its end B describes an arc BB'. Likewise, when the line CD swings about a pivot intermediate its ends, its end C describes an arc CC' which intersects the arc BB'. If the arc CC' does not intersect the chord BB' subtending the arc BB' and the arc BB' does not intercept the chord CC' subtending the arc CC', then the lines AB and CD may be swung successively to their dotted positions. These principles are embodied in the spacing arrangement for the egg supporting means illustrated in Figs. 1, 6, 7, 8, 9 and 10.

In Figs. 1 and 6, all of the cam members 16 and 16', and the egg trays associated therewith, are similarly inclined and the actuating bar is in its extreme left hand position. It will be noted that in each of the cam members 16, the pivot bolts 56 are also at the extreme left hand ends of the slots 55, while in the cam members 16', the pivot bolts 56 are at the junction of the radial portions 55' and the inclined portions 55'' of the cam slots. As the actuating bar 34 moves to the right from the position shown in Fig. 6 to that shown in Fig. 7, the pivot bolts 56 in the cam members 16 travel only half way through the horizontal portions 55'' of the cam slots and therefore the cam members 16 are retained in the same position as in Fig. 6. During this same movement of the actuating bar, the pivot bolts 56 in the slots of the cam members 16' travel to the lower ends of the radial portions 55' of these slots and this swings the cams 16' to a horizontal position. As the trays 26 and frames 21 associated with each cam member are parallel to the lower edge thereof, it will be evident that the position of the egg supporting means of each column is always indicated by the position of the cam member.

As the actuating bar is moved further to the right to the position of Fig. 8, the pivot bolts travel to the ends of the horizontal portions 55'' of the slots in the cam members 16, but these pivot bolts do not enter the radial portions of the slots. The cam members 16, therefore, remain in the same positions. This same movement of the actuating bar carries the pivot bolts from the lower to the outer ends of the radial portions 55' of the slots in cam members 16' and swings these cam members to the positions shown in Fig. 8.

It should now be evident that when the actuating bar continues its movement to the right to the position shown in Fig. 9, the pivots in travelling to the lower ends of the radial portions 55', swing the cam members 16 to a horizontal position while the cam members 16' remain unchanged, since in these the pivot bolts have travelled only part way along the horizontal portions 55'' of the slots. As the actuating bar moves to its extreme right hand position in Fig. 10, the pivot bolts moving outwardly through the radial portions 55' of the slots swing the cam members to the inclined positions shown, while the cam members 16' retain their positions of Fig. 9 as the pivot bolts travel only to the ends of the horizontal portions 55'' of the slots.

The cam members and the egg supporting means may be shifted to the positions shown in Figs. 6–10 by operating the hand wheel 49 and thereby transmitting motion from sprocket 51 through the chain 52 to the sprocket 48 which rotates the screw shaft 41 and causes the nut 38 to travel and to carry with it the actuating bar 34. The actuating bars 34 on each of the channels 14 and 15 are actuated in unison by the chain 50 (Fig. 3) operating over the sprockets 47, so that corresponding columns of egg supporting means in both incubating compartments are shifted simultaneously. It will also be evident that the actuating bar may be caused to travel from right to left as viewed in Figs. 6–10.

In using this apparatus the trays are loaded into the frames or removed therefrom only when the frames are in a horizontal position. Thus, by setting the apparatus to the position shown in Fig. 7, the trays associated with the cam members 16' may be passed between the links 18 into or from the frames 21. Likewise, the trays associated with the cam members 16 may be loaded or unloaded from the position shown in Fig. 9. During incubation, the eggs may be turned as desired from the inclined position shown in Fig. 6 to the oppositely inclined position shown in Fig. 10, and only alternate columns of egg supporting means need be shifted at one time.

The term "egg supporting means" and like expressions, as used herein and in the claims, are intended to include the tray frame which holds the egg tray in incubators in which the individual trays are supported in frames, and also the individual egg trays in incubators in which the egg trays are hung or otherwise suspended directly from upright supporting members without the aid of individual frames for the egg trays.

The term "tier" as used herein and in the claims with respect to the egg supporting means denotes those egg supporting means which lie within substantially the same horizontal plane or stratum in a group of egg supporting means. Similarly, the term "column" as used herein and in the claims with respect to the egg supporting means denotes those egg supporting means which lie within substantially the same vertical plane or stratum in a group of egg supporting means.

While the preferred form of the invention and the best known mode of applying the principles thereof have been illustrated and described herein, it will be understood that various modifications will occur to those skilled in the art when informed by this specification, and that the invention is not limited except as indicated by the appended claims.

What is claimed is:

1. In an incubator, the combination of egg supporting means arranged in adjacent tiers, means for supporting said egg supporting means for tilting movement about substantially fixed and horizontal axes, the horizontal distance between vertical planes through said axes being less than the width of an egg supporting means when said egg supporting means is in an untilted position.

2. In an incubator comprising tiers of egg supporting means arranged in columns, the combination of means for supporting each egg supporting means for tilting movement about a substantially horizontal axis, the egg supporting means of adjacent columns being spaced for tilting movement through intersecting arcs, the egg supporting means of one column being adapted to tilt freely without intercepting chords subtending the arcs described by egg supporting means of adjacent columns during tilting movement of the latter.

3. In an incubator comprising tiers of egg supporting means arranged in columns, the combination of means for supporting each egg supporting means for tilting movement about a substantially horizontal axis, the egg supporting means of adjacent columns being spaced for tilting movement through intersecting arcs, the egg supporting means of one column being adapted to tilt freely without intercepting chords subtending the arcs described by egg supporting means of adjacent columns during tilting movement of the latter, and means for tilting alternate columns of egg supporting means simultaneously.

4. In an incubator comprising tiers of egg supporting means arranged in columns, the combination of means for supporting each egg supporting means for tilting movement about a substantially horizontal axis, the egg supporting means of adjacent columns being spaced for tilting movement through intersecting arcs, the egg supporting means of one column being adapted to tilt freely without intercepting chords subtending the arcs described by egg supporting means of adjacent columns during tilting movement of the latter, and means for tilting adjacent columns of egg supporting means successively.

5. In an incubator comprising tiers of egg supporting means arranged in columns, the combination of means for supporting each egg supporting means for tilting movement about a substantially horizontal axis, the egg supporting means of adjacent columns being spaced for tilting movement through intersecting arcs, the egg supporting means of one column being adapted to tilt freely without intercepting chords subtending the arcs described by egg supporting means of adjacent columns during tilting movement of the latter, and means for tilting adjacent columns of egg supporting means successively and alternate columns of egg supporting means simultaneously.

6. In an incubator comprising tiers of egg supporting means arranged in columns, the combination of means for supporting each egg supporting means for tilting movement about a substantially horizontal axis, and means for tilting only alternate columns of egg supporting means simultaneously.

7. In an incubator comprising tiers of egg supporting means arranged in columns, the combination of means for supporting each egg supporting means for tilting movement about a substantially horizontal axis, and means common to all of said columns of egg supporting means for tilting adjacent columns of egg supporting means successively.

8. In an incubator comprising tiers of egg supporting means arranged in columns, the combination of means for supporting each egg supporting means for tilting movement about a substantially horizontal axis, and progressively operable means for tilting alternate columns of egg supporting means simultaneously and then for simultaneously tilting the remaining columns of egg supporting means.

9. In an incubator comprising tiers of egg supporting means arranged in columns, the combination of means for supporting each egg supporting means for tilting movement about a substantially horizontal axis, the egg supporting means of adjacent columns being spaced for tilting movement through intersecting arcs, the egg supporting means of one column being adapted to tilt freely without intercepting chords subtending the arcs described by egg supporting means of adjacent columns during tilting movement of the latter, a pivotally mounted cam member associated with each of said columns of egg supporting means, means for transmitting pivotal movement from each cam member to the egg supporting means of the column associated therewith, a longitudinally movable actuating bar, and cooperating cam surfaces and a follower associated with said bar and each of said cam members, said cam surfaces comprising similarly disposed substantially radial surfaces on each cam member and other surfaces extending at an angle to said substantially radial surfaces, said angularly extending surfaces on cam members associated with adjacent columns being oppositely inclined.

10. In an incubator comprising tiers of egg supporting means arranged in columns, the combination of a pivotally mounted cam member associated with each of said columns of egg supporting means, means for transmitting pivotal movement from each cam member to the egg supporting means of the column associated therewith, a longitudinally movable actuating bar, and cooperating cam surfaces and a follower associated with said bar and each of said cam members for actuating the latter to tilt the egg supporting means, said cam surfaces comprising similarly directed substantially radial surfaces on each cam member and other substantially parallel surfaces extending at an angle other than 180° to said substantially radial surfaces.

11. In an incubator comprising tiers of egg supporting means arranged in columns, the combination of a pivotally mounted cam member associated with each of said columns of egg supporting means, means for transmitting pivotal movement from each cam member to the egg supporting means of the column associated therewith, a longitudinally movable actuating bar, and cooperating cam surfaces and a follower associated with said bar and each of said cam members for actuating the latter to tilt the egg supporting means, said cam surfaces comprising similarly directed substantially radial surfaces on each cam member and other substantially parallel surfaces extending at an angle to said substantially radial surfaces, said angularly extending surfaces on cam members associated with adjacent columns being oppositely inclined.

12. In an incubator, tiers of egg supporting means arranged in columns and means for supporting each egg supporting means for tilting movement about a substantially horizontal axis, said axes in each column being disposed at all times in substantially the same plane, the planes of said axes in adjacent columns being spaced a less distance than the width of a column of egg supporting means when said means are in an untilted position.

13. In an incubator, tiers of egg supporting means arranged in columns and means for supporting each egg supporting means for tilting movement about a substantially horizontal axis extending lengthwise of said egg supporting means between the sides thereof, said axes in each column being disposed in substantially the same plane, the planes of said axes in adjacent columns being spaced a less distance than the width of a column of egg supporting means when said means are in an untilted position.

14. In an incubator, the combination of egg supporting means arranged in tiers, means for supporting said egg supporting means for tilting movement about substantially parallel axes, said egg supporting means being arranged with respect to adjacent egg supporting means so that the projection of one untilted egg-supporting means upon the plane defined by said axes is partly coextensive with the projection of an adjacent untilted egg supporting means upon said plane.

15. In an incubator, the combination of a plurality of egg supporting means arranged in tiers, means for supporting said egg supporting means for tilting movement about substantially parallel axes, the length of each tier being less than the sum of the widths of the egg supporting means in said tier, the width of each egg supporting means being determined by projecting the untilted egg supporting means upon the plane defined by said axes.

16. The combination comprising egg supporting means arranged in adjacent tiers, each of said tiers comprising a plurality of egg supporting means arranged during normal operation in a substantially spaced relationship, and means for supporting said egg supporting means for tilting movement through intersecting arcs, said egg supporting means being spaced so that the arc described by one of said egg supporting means during complete tilting movement thereof does not intercept the chord subtending the arc described by the adjacent egg supporting means during its complete tilting movement.

17. In an incubator comprising tiers of egg supporting means arranged in columns, the combination of means for supporting each egg supporting means for tilting movement about a substantially horizontal axis, and progressively operable means for tilting alternate columns of egg supporting means simultaneously and then for simultaneously tilting the remaining columns of egg supporting means, said progressively operable tilting means comprising a plurality of pivotal members, each pivotal member supporting a column of egg supporting means, a horizontally reciprocal actuating member engaging all of said pivotal members, and cams and followers connecting said horizontal reciprocal actuating member and said pivotal members for tilting movement, each of said cams comprising a cam slot having a portion parallel to similar portions of adjacent cam slots during certain periods of operation, and a continuation angularly disposed to said parallel portion, the continuations of adjacent cam slots being oppositely directed during certain periods of operation.

18. In an incubator comprising tiers of egg supporting means arranged in columns, the combination of a pivotally mounted member associated with each of said columns of egg supporting means, means for transmitting pivotal movement from each pivotal member to the egg supporting means of the column associated therewith, a longitudinally movable actuating bar, and cooperating cam surfaces and a follower associated which said bar and each of said pivotal members for actuating the latter to tilt the egg supporting means, said cam surfaces comprising substantially parallel portions with continuing surfaces at an angle other than 180° to each substantially parallel surface, the continuing surfaces being parallel.

19. In an incubator comprising tiers of egg supporting means arranged in columns, the combination of means for supporting each egg supporting means for tilting movement about a substantially horizontal axis, and means for tilting only alternate columns of egg supporting means simultaneously, said means comprising a longitudinally movable actuating bar engaging a plurality of pivotal members, each of said pivotal members being associated with a column of egg supporting means, and camming means connecting said actuating bar and said pivotal members.

20. In an incubator comprising tiers of egg supporting means arranged in columns, the combination of means for supporting each egg supporting means for tilting movement about a substantially horizontal axis, and means common to all of said egg supporting means for tilting adjacent columns of egg supporting means successively, said means comprising a longitudinally movable actuating bar engaging a plurality of pivotal members, each of said pivotal members being associated with a column of egg supporting means, and camming means connecting said actuating bar and said pivotal members.

SAMUEL H. SMITH.